March 27, 1962 R. H. WEGENER 3,026,791
METHOD AND APPARATUS FOR PACKAGING FOODSTUFFS
Filed March 17, 1958 3 Sheets-Sheet 1
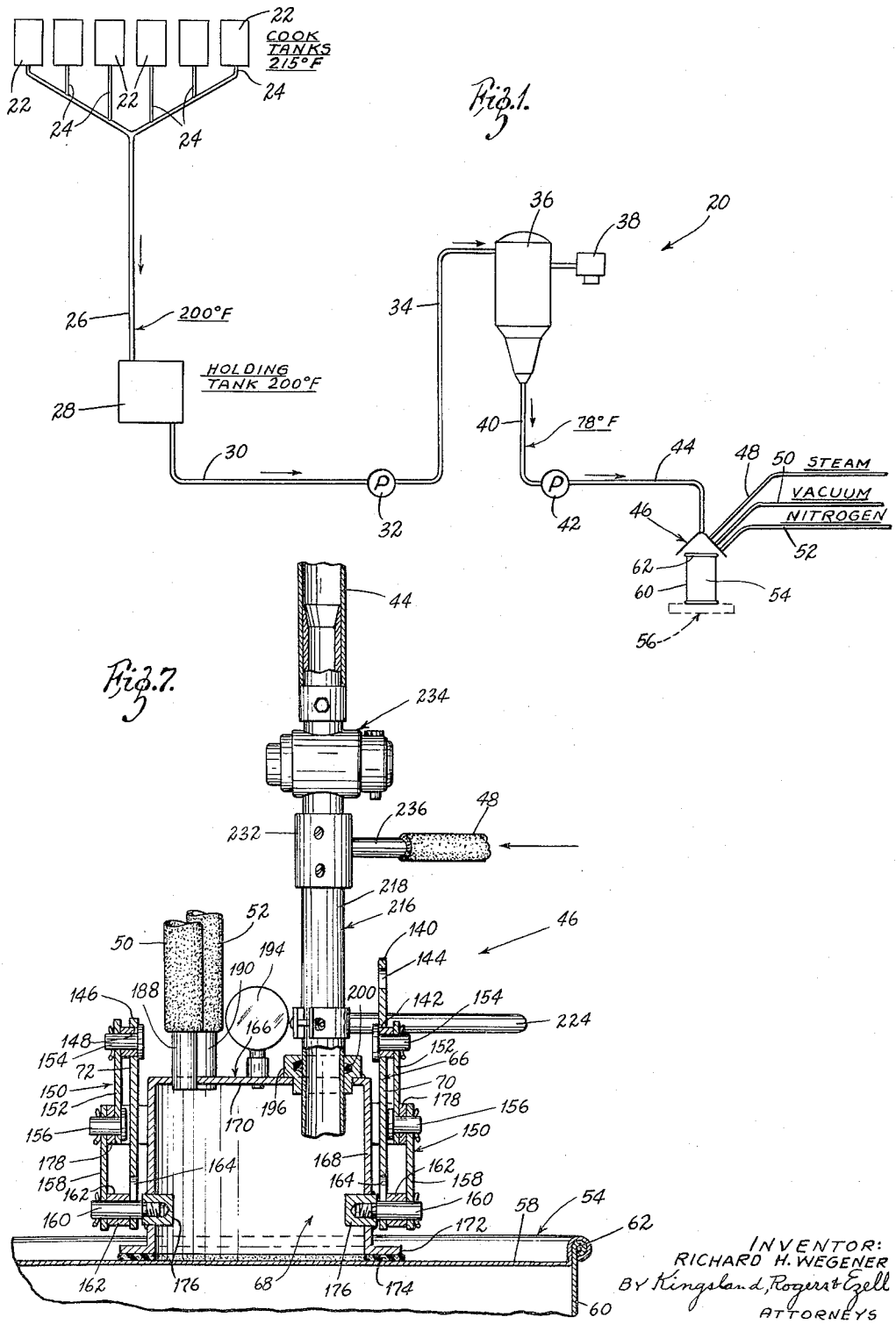
INVENTOR:
RICHARD H. WEGENER
BY Kingsland, Rogers & Ezell
ATTORNEYS

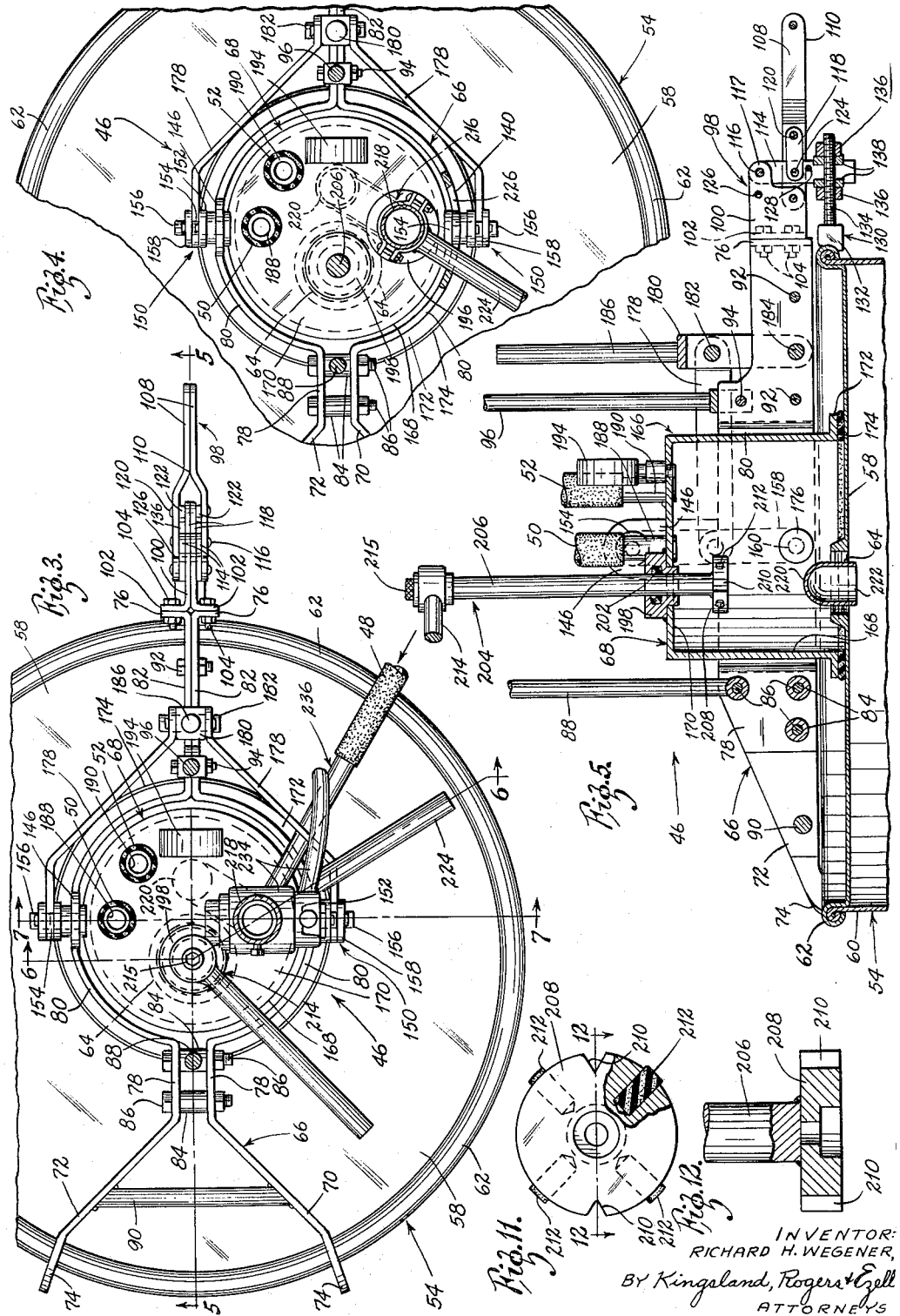

March 27, 1962  R. H. WEGENER  3,026,791
METHOD AND APPARATUS FOR PACKAGING FOODSTUFFS
Filed March 17, 1958  3 Sheets-Sheet 3
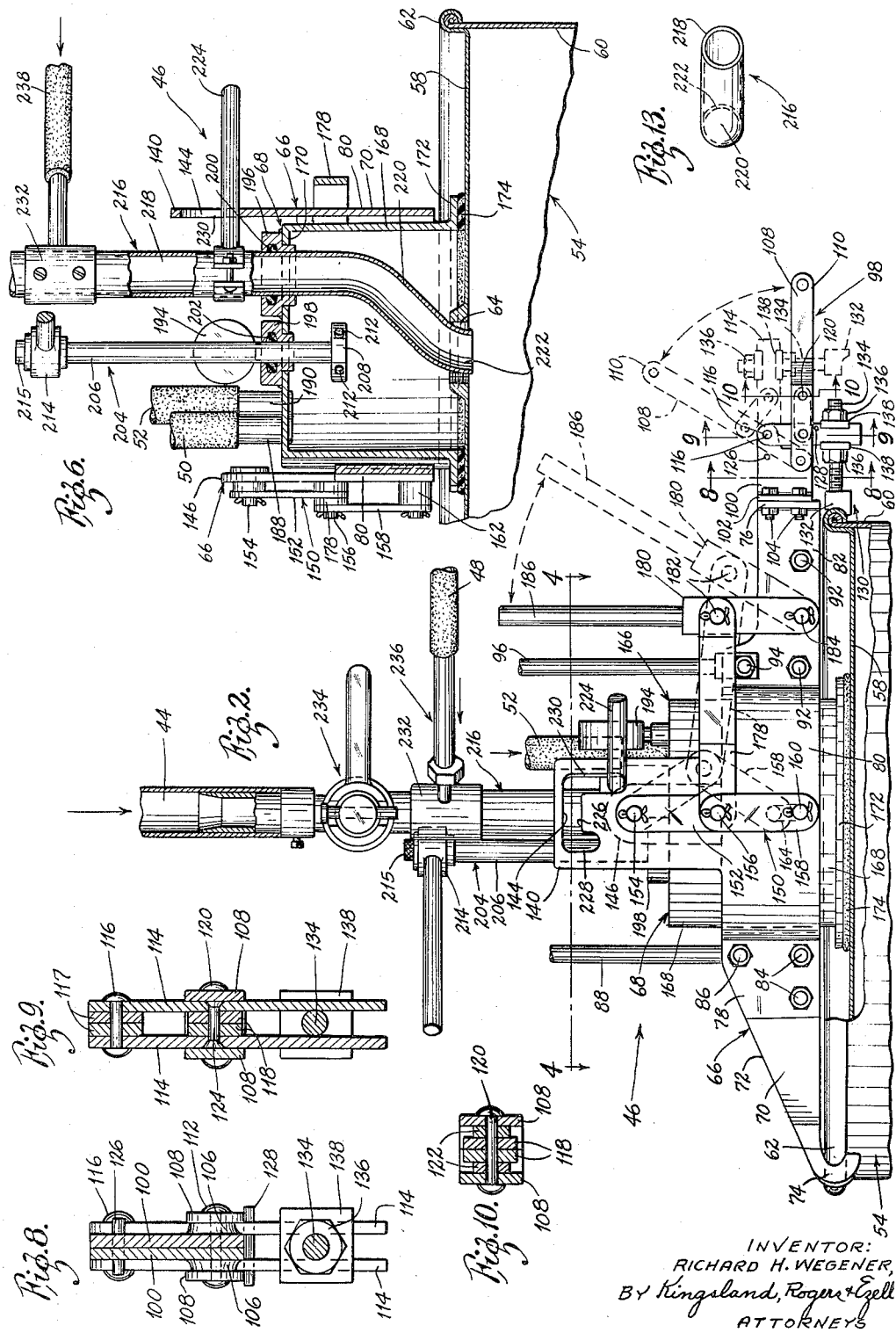
INVENTOR:
RICHARD H. WEGENER,
BY Kingsland, Rogers & Ezell
ATTORNEYS United States Patent Office
3,026,791
Patented Mar. 27, 1962

3,026,791
METHOD AND APPARATUS FOR PACKAGING FOODSTUFFS
Richard H. Wegener, Belleville, Ill., assignor to Brooks Foods, Inc., Collinsville, Ill., a corporation of Delaware
Filed Mar. 17, 1958, Ser. No. 721,853
10 Claims. (Cl. 99—356)

The present invention relates generally to the processing and handling of foodstuffs, and more particularly to methods and apparatus for handling foodstuffs while maintaining a high degree of sterility.

In certain food industries it has been found feasible, due to the seasonal nature of maturation of the food crop, to provide initial processing of substantially the whole crop in a manner which will permit the processed food to be stored for a period of weeks or months prior to being finally packaged for market. An example of such a foodstuff is, of course, tomato products, such as catsup and the like. Thus, in order to save warehouse space, as well as to accommodate a complete harvest of ripened tomatoes which constitute the base of many food products, it has been found expedient to reduce the fresh crop to a tomato paste and to store the paste in drums pending final conversion to a particular food and the packaging for retail sale.

The nature of many foodstuffs, however, and tomatoes in particular, is such that any contamination with certain forms of bacteria may lead to spoilage, and even the presence of air may cause discoloration or darkening which is deleterious to the quality of the final product. Hence it is mandatory, not only that such foods be processed in a manner to destroy harmful bacteria, but that the handling of the sterilized food be such that there can be no subsequent introduction of bacteria or other undesired elements into either the processed food or into the container in which it is to be stored.

The present invention discloses a processing system which handles foodstuff from the cooked product through process to its storage container in a manner to maintain complete sterility throughout. A unique feature of the apparatus here disclosed comprises a filling head by means of which the sterile food is transferred from the processing system to a sterile drum without even coming into contact with the free air of the filling room.

It is an object of the present invention, therefore, to provide a novel system for handling processed foodstuffs in a sterile manner.

It is another object of the invention to provide a novel system for transferring processed foodstuffs to a storage container in a manner which avoids the possibility of contamination of the foodstuff.

It is another object of the invention to provide a novel process for treating and handling a food product including rapid cooling of the heated product followed by immediate sealing of the product in storage containers.

It is another object of the invention to provide a novel filling head for transferring sterile foodstuffs from a processing system to a storage container.

It is another object of the invention to provide a filling head for a storage container which incorporates novel means for attachment to the container and for subsequent sterilization of both the filling head itself and the container.

It is another object of the invention to provide a novel filling head for use with a drum, or the like, which incorporates means for sealing the filling head to the drum, means for admitting steam to the drum, and means for drawing a vacuum on the drum.

It is another object of the invention to provide a novel filling head which may be disposed over an opening in a container and which incorporates means for closing the opening prior to removal of the filling head from the container.

The foregoing, along with additional objects and advantages, will be apparent from the following description of a specific embodiment of the invention as depicted in the accompanying drawings, in which:

FIGURE 1 is a schematic representation of a system for processing foodstuffs and for transferring the processed foodstuffs to storage containers in conformance with the present invention;

FIGURE 2 is a side elevation, partly in section, showing the filling head of the present invention secured to the top of a steel drum, the latter shown fragmentarily and partly in section;

FIGURE 3 is a top plan view of the filling head and drum of FIGURE 2;

FIGURE 4 is a horizontal section generally similar to FIGURE 3, but taken along the line 4—4 of FIGURE 2;

FIGURE 5 is a vertical section of the filling head and the top of the drum taken generally along the line 5—5 of FIGURE 3;

FIGURE 6 is a fragmentary vertical section showing further details of the filling head and being taken generally along the line 6—6 of FIGURE 3;

FIGURE 7 is a vertical section showing still further details of the filling head and being taken generally along the line 7—7 of FIGURE 3;

FIGURES 8, 9, and 10 are enlarged vertical sections showing details of certain linkages forming part of the filling head and being taken generally along the lines 8—8, 9—9, and 10—10, respectively, of FIGURE 2;

FIGURE 11 is a bottom plan view, partly in section, showing a bung holder forming part of the filling head assembly;

FIGURE 12 is a vertical section taken generally along the line 12—12 of FIGURE 11; and FIGURE 13 is a top plan view of a removed filling nozzle.

Directing more particular attention to FIGURE 1 of the drawings, the numeral 20 designates generally a food processing and filling system arranged in accordance with the teachings of the invention. The system 20 comprises a plurality of elevated cook tanks 22 each having a bottom discharge 24 which feeds into a manifold line 26 discharging into a holding tank 28. These tanks and lines are preferably constructed of stainless steel or like material. A bottom discharge line 30 connects the holding tank 28 with a pump 32 which serves to force the food through a line 34 to an elevated cooling chamber 36 provided with conventional steam ejecting apparatus 38 for maintaining a predetermined vacuum condition in the chamber 36. A bottom discharge line 40 connects the chamber 36 with a pump 42 by means of which processed food may be forced through a line 44 to a filling head assembly 46. The filling head assembly 46 is provided with a steam connection 48, a vacuum connection 50 and a nitrogen gas connection 52. In addition, the assembly 46 is adapted for connection, as will appear, to individual storage drums 54 which are filled, one at a time, on a scale 56.

The general configuration of the filling head 46 is depicted clearly in the side elevation of FIGURE 2 and the top plan view of FIGURE 3. It is also clear from these figures that the drum 54 with which the assembly 46 is adapted to cooperate has a flat top or head 58 having conventional securement with the cylindrical portion 60 in a manner to form a laterally extending rounded bead 62. A threaded bung hole 64 is provided at the center of the circular top 58, as clearly shown in the sectional views of FIGURES 5 and 6.

For convenience of description of both structure and function, the filling head assembly may be considered to comprise a drum clamp assembly and a housing assembly, designated in the drawings by the numerals 66 and 68, respectively. Still referring to FIGURES 2 and 3, the drum clamp assembly 66 comprises a pair of generally strap-like members 70 and 72 formed at one end (the left in FIGURES 2 and 3) to provide hooks 74 for engagement with the drum bead 62. Referring now particularly to FIGURE 3, the members 70 and 72 are formed to comprise a rigid cradle which extends across the drum head 58 and terminates in flanges 76. Between the hooks 74 and the flanges 76, the members 70 and 72 are formed so as to come almost together at parallel portions 78, then to extend in circular arcs around opposite sides of the housing assembly 68 as shown at 80, and finally to come together in flush parallel engagement as shown at 82. The members 70 and 72 are rigidly interconnected at the portions 78 by means of bolts and spacer assemblies 84 and 86, the latter provided with an upstanding suspension rod 88. A compression rod 90 is secured, as by welding, to the member 72 and extends to substantially flush engagement with the member 70, as shown, to prevent bending of the members 70 and 72 in a manner to bring the hooks 74 together. The portions 82 of the members 70 and 72 are secured in flush engagement by means of bolt assemblies 92 and 94, the latter serving, in addition, to secure a suspension rod 96.

A clamping assembly 98 includes a pair of angle brackets 100 disposed in flush engagement as clearly shown in FIGURE 3 and having oppositely extending flanges 102 secured to respective flanges 76 by means of bolt assemblies 104. The brackets 100 are provided with oppositely extending bosses 106 as shown in FIGURE 8, and these bosses 106 are embraced by dual lever members 108 formed as indicated in FIGURE 3 to provide a forked lever 110. The forked end of the lever 110 has pivotal connection with the aforementioned boss portions 106 by means of a pivot pin 112. A pair of clamp links 114 are pivotally connected by means of a pin 116 to an extended ear portion 117 of the bracket 100. These links 114 embrace the ear-like portions 117 and extend through the forked portion of the lever 110. A pair of connecting links 118, shown in side elevation in FIGURE 5 and in enlarged section in FIGURE 10, have pivotal connection both to the forked portion of the lever 110 and to the clamp links 114. As is clear from FIGURE 10, the connection with the members 108 of the lever 110 is by means of a pin 120, with spacers 122 being interposed between the members 108 and the respective links 118. A pin 124 (FIGURES 5 and 9) having countersunk heads provides pivotal connection between the links 118 and the links 114 in a manner to avoid interference with the members 108 of the lever 110. A cross pin 126 inserted through the bracket members 100 limits the upward travel of the lever 110 as shown in FIGURE 2. A similar cross pin 128 inserted through the clamp links 114 limits the downward movement of the lever 110.

A clamp dog 130 having a head 132 shaped for interlocking engagement with a drum bead 62 has also a threaded stem 134 carrying two nuts 136. These nuts 136 embrace a pair of channel-shaped slides 138 which in turn embrace the clamp links 114 as best shown in the cross sectional views of FIGURES 5, 8 and 9. Clearly, the arrangement provides for both vertical and lateral adjustment of the head 132 of the dog 130.

Returning once more to the members 70 and 72 of the drum clamp assembly 66, and particularly to the arcuate portions 80 thereof, it will be observed that each of these members has an upwardly extending portion generally opposing the other across a major diameter of the combined arcuate portions 80. Thus, the member 70 has (FIGURES 2 and 7) an upstanding portion 140 provided with a round aperture 142 at an intermediate level and with an inverted U-shaped slot 144 thereabove. The oppositely located member 72 has an upstanding portion 146 provided only with an aperture 148 in coaxial relation with the aperture 142.

By means of the upstanding portions 140 and 146, and their respective apertures 142 and 148, the drum clamp assembly 66 is enabled to support the housing assembly 68 as clearly shown in FIGURE 7. This support is by way of dual linkages 150, each comprising an upper link 152 pivotally connected by a pin 154 to a respective one of the apertures 142 and 148, and articulately joined by means of a pin 156 to a lower link 158 in pivotal connection with a pin 160 having threaded connection with the housing assembly 68, as will appear. As is clear from the illustration, the pins 160 are provided with spacers 162 interposed between the links 158 and the respective members 70 and 72. It will also be observed that the members 70 and 72 are provided with vertical slots 164 which accommodate free vertical movement of the pin 160 relative thereto.

Considering now the housing assembly 68, a main housing 166 takes the form of an inverted pot having cylindrical side walls 168 surmounted by a circular plate-like top 170. The open bottom of the housing 166 is provided with a radially extending flange 172 to which is securely cemented a compressible rubber gasket 174.

As previously indicated, the housing 166 is connected by linkages 150 to the drum clamp assembly 66, and for this purpose a pair of cylindrical bosses 176 are located in diametrically opposed relation in the side wall 168 of the housing 166. The bosses 176 are preferably welded into the side wall 168 and provided with a blind tapped hole for receiving the respective pins 160 of the aforesaid linkages. The arrangement is clearly depicted in FIGURE 7, from which it will be observed that the possibility of fluid leakage at these points of connection is completely eliminated.

A yoke connection to the linkages 150 is shown in FIGURES 2 and 4 to comprise yoke members 178 of strap metal bent to the plan form clearly indicated in FIGURE 4 and connected at one end to a respective pivot pin 156 of the linkages 150. The other ends of the yoke members 178 are brought to opposite sides of an upstanding lever 180 and are pivotally connected thereto by means of a common pivot pin 182. The lower end of the lever 180 is forked so as to embrace the juxtaposed portions 82 of the drum clamps 70 and 72. The lever 180 is connected by a pin 184 to these portions 82, and is provided with an upwardly extending handle 186 for manual operation in a manner to be explained hereinafter.

The circular top 170 of the housing 166 is provided with three fixed connections. These include an upstanding nipple 188 for connection with the flexible vacuum line 50, a nipple 190 for connection with the flexible nitrogen gas line 52, and a vacuum gauge 194. While these connections into the top 170 may take any conventional form, it is preferred that they be welded into place in order to eliminate the possibility of leakage which could lead to contamination of the product.

In addition to the above-described fixed connections which provide communication with the interior of the housing 166, there are provided two movable connections. These movable connections take the form of fixed glands 196 (FIG. 7) and 198 (FIG. 5). These glands 196 and 198, shaped as depicted in the drawing, are welded into the top 170, and each is provided with a center opening for accommodation of a movable element to be described. The glands 196 and 198 are each provided with an internal annular groove for receiving respective sealing rings 200 and 202. These rings may be of any conventional design, such as O-rings.

Although the specific locations of the fixed connections 188, 190, and 194 in the housing top 170 are relatively unimportant, the location of the movable connections have a significance which will become apparent.

Thus, it may be noted from the plan views of FIGURES 3 and 4 that the gland 198 is located on a transverse center line of the top 170, which center line is normal to a central vertical plane which passes through the points of suspension of the housing 166. It will be noted further that, being thus positioned, the gland 198 is on the main longitudinal center line of the drum clamp assembly 66 and, thus, directly over a center line of the drum head 58 which passes through the bung hole 64.

Attention may also be directed at this time to the fact that the drum clamp assembly 66 is proportioned so as to dispose the vertical center line of the housing 166 in offset relationship to the vertical center line of the drum 54 and the corresponding axis of the bung hole 64. Finally, it is clearly evident from the illustration that the distance which the gland 198 is offset from the true center of the housing 166 is such as to dispose this gland in coaxial relationship with a bung hole 64 when the filling head assembly 46 is clamped onto a drum 54.

A wrenching assembly 204 comprises a vertical wrench rod 206 which extends through a central opening of the above-described gland 198. A bung holder 208 (FIGURES 11 and 12) takes the form of a disc-like member provided with external diametrically opposed V-notches 210 and has inserted therein a plurality of resilient plugs 212 of rubber or like material. As shown in the illustration, the plugs 212 project beyond the periphery of the member 208 and are thereby enabled to retain a conventional type of bung having a hollow cavity in the top thereof. The V-notches 210 of the member 208 receive the usual finger tabs of the bung so as to enable the latter to be firmly emplaced in a bung hole 64 despite its enclosure by the housing 166. The member 208 is secured, as by welding, to the lower end of the wrench rod 206, the latter being, of course, both vertically and rotatably movable in the gland 198. A conventional ratchet wrench 214 is connected to the upper end of the rod 206 and preferably secured by a conventional bolt or nut fastener 215.

A filling spout or nozzle 216 extends through the gland 196, as best illustrated in FIGURES 6 and 7. The vertical configuration of the nozzle 216 is shown in FIGURE 6 to comprise an elongated vertical section 218 and a lower offset section 220. FIGURE 13 shows the nozzle 216 in horizontal plan form so as clearly to illustrate this offset. The upper straight portion 218 of the nozzle 216 is movable both vertically and rotatably in the gland 196, and it will be observed from the plan view of FIGURE 3, as well as from the vertical section of FIGURE 6, that the location of the gland 196 in the top 170 is coordinated with the degree of offset in the nozzle 216 so that a lower vertical end portion 222 of the latter may be disposed coaxially with the vertical axis of the gland 198 and, hence, with the axis of a bung hole opening 64 when the filling head 46 is in appropriate position atop a drum 54. A lever-like handle 224 having clamped engagement with the vertical portion 218 of the nozzle 216 constitutes means for raising and lowering, as well as for swinging the offset portion 220 within the housing 166.

As shown in FIGURES 2 and 6, the lever 224 extends through the previously described inverted U-shaped slot 144 in the upward extension 140 of the drum clamp member 70, and it will be noted from FIGURE 2 that the slot 144 includes, in addition to a horizontal portion 226, a short vertical portion 228 and a long vertical portion 230. It may now also be made clear that with the handle 224 at the bottom of the long slot portion 230, the lower end 222 of the nozzle 216 is positioned on the extended axis of the wrench rod 206 and lowered sufficiently to occupy an associated bung hole 64. It will be further understood that by moving the handle 224 to the lower end of the short vertical portion 228 of the slot 144, the offset portion 220 of the nozzle 216 will be withdrawn from the bung hole opening 64 and swung aside to a position, illustrated in FIGURE 4, completely away from the axis of the wrenching assembly 204.

As shown best in FIGURES 2 and 7, the upper end of the filling nozzle 216 is connected by means of a coupling 232 with a stop-cock assembly 234 and, thence, with the feed line 44 previously mentioned. The coupling 232 receives a nipple assembly 236 for connection with the flexible steam line 48.

*Operation*

As previously indicated, the apparatus here described and illustrated has for its primary purpose the preparation and storage of perishable foodstuffs, and particularly of processed tomato pulp. Although the desirability of reducing a seasonal crop of tomatoes to a tomato paste suitable for temporary storage in large containers has long been recognized as desirable, it has not infrequently been found that the temporarily stored product loses quality, if not by spoilage, at least by darkening. The difficulty has been attributed to the presence of bacteria, oxygen, or both in the stored product, either as a result of improper cooking and subsequent cooling, or as a result of contamination in handling the once sterile product from the cook tanks into the final sealed container. The processing method herein set forth has been found to provide a completely sterile product of high quality suitable for temporary storage and delayed packaging, and the novel filling head and method of operating the same have, together, provided a means and method for eliminating contamination or oxidation of the product in the handling and storage thereof.

Referring once more to FIGURE 1, the processing method herein contemplated comprises cooking tomatoes in cook tanks 22 which may be heated by various means, such as steam coils, and raising the temperature of the product to approximately 215° F. The cooked tomato pulp is then transferred by gravity to the holding tank 28, with its temperature being maintained at approximately 200° F. From the holding tank 28, the product is pumped, as needed, by the pump 32 into the cooler 36 which is maintained at high vacuum, for example, 29½" of mercury vacuum, so that the product is very quickly cooled by a well understood evaporative process to a temperature of 79° F. or below. The cooled product is then pumped by means of the pump 42 to the filling head 46 for storage in containers such as the drums 54. The handling of the product from the line 44 into the containers 54 and the sealing of the latter is effected without contamination of the product through utilization of the filling head assembly 46 in the manner to be described hereinafter.

It may be mentioned that, in general, all elements of the processing apparatus here mentioned are preferably constructed of stainless steel and are, of course, completely sterilized before the introduction of the food products by introducing high temperature steam thereto for a sufficient period of time to destroy all bacteria. Inasmuch then as the system is closed from the cook tanks 22 to the filling head 46, the first possibility of contamination from the outside must, perforce, occur in the vicinity of the filling head 46. Thus, it may be assumed for the purpose of the present discussion that completely sterile food products are brought forward through the line 44 to the stop-cock assembly 234.

Assuming now that the drums 54 have been previously cleaned and sterilized by steam baths or the like before being brought to the filling station, one of the drums 54 is disposed on the platform scale 56 beneath the filling head 46. The latter, suspended from the rods 88 and 96, is lowered by appropriate means (not shown) over the top 58 of the drum 54 so as to engage the hooks 74 of the drum clamp assembly with the bead 62. The handle 110 of the clamping assembly 98 is then moved downwardly so as to engage the clamping dog 132 with another part of the bead 62. As is clear from the drawings, the downward position of the handle 110 disposes the clamping linkage in a dead center condition which prevents inadvertent dislocation of the clamping assembly from the drum 54.

With the clamping assembly 98 thus secured to the bead 62 of the drum 54, the housing 166 of the housing assembly 68 will rest upon the top 58 so as to cover the bung opening 64. It will be understood of course that the linkage assembly 150 which supports the housing 166 from the drum clamp assembly 66 is arranged to permit the gasketed housing 166 to engage the drum top 58. At this point a vacuum is drawn in the vacuum line 50 by conventional means (not shown) so that air is evacuated from the interior of the housing 166, thereby effecting a tight seal between the gasket 174 and the drum head 58. The vacuum gauge 194 serves to indicate the fact that a suitable vacuum is established for effecting the desired seal.

With the portion of the drum top 58 containing the bung opening 64 sealed off from the outside atmosphere, the wrenching assembly 204 may be moved downwardly and rotated to engage the bung and to remove it from the opening 64. The assembly 204 is then withdrawn upwardly, while retaining the bung, to clear the way for entry of the lower end of the filling nozzle 216 into the bung opening 64. The insertion of the end 222 of the nozzle 216 into the bung opening 64 is, as previously mentioned, effected through manipulation of the lever handle 224 in the slot 144. At this point, live steam is introduced through the steam line 48 so as to pass through the filling nozzle 216 and fill, not only the interior of the housing 166, but also the interior of the drum 54, thereby insuring the destruction of any bacteria which may at this time be present. The steam after filling the housing 166 and drum 54 is withdrawn through the vacuum line 50.

Following this period of steaming of all interior surfaces which could possibly contact the food product, the steam is turned off by appropriate means (not shown), and the food product is introduced through the nozzle 216 into the drum 54. The vacuum remains on to maintain the seal and to withdraw steam or air displaced by the product. When the drum is substantially filled, as indicated by the scale 56, the flow of food product is cut off by means of the stop-cock 234 and the nozzle 216 is removed from the bung opening 64. While this is being done, the vacuum is finally turned off and nitrogen gas is introduced through the nitrogen line 52 from an appropriate pressure source (not shown) so as to pervade the interior of the housing 166 and that portion of the drum 54 above the level of the food product and to produce a positive pressure therein. A pressure of five pounds per square inch has been found sufficient to indicate leaks and to assure leakage from inside out, rather than vice versa.

Finally, with the filling nozzle 216 out of the way, the wrenching assembly 204 is lowered so as to insert the bung into the bung opening 64 and the drum 54 is sealed by wrenching the bung securely into its opening. The nitrogen can now be turned off, and the filling head is ready to be removed from one drum 54 and disposed over a succeeding one. Before the housing 166 can be removed from the one head 58, however, it will ordinarily have to be forceably loosened from the tight sealing condition effected for the filling operation. This loosening is accomplished by pulling on the lever handle 186 in a manner to operate the linkage assembly 150, as clearly illustrated in FIGURE 2. This operation of the linkage 150 lifts the housing assembly 68 from its sealed engagement with the drum head 58 and the whole filling head assembly 46 may then be raised from the drum 54.

Clearly, there has been provided a method for processing foodstuffs, along with means and methods for handling the processed foodstuff, which fulfills the objects and advantages sought therefor.

It is to be understood that the foregoing description and the accompanying drawings have been given by way of illustration and example. It is further to be understod that changes in the form of the elements, rearrangement of parts, and the addition or substitution of equivalent structural elements or process steps, all of which will be now apparent to those skilled in the pertinent art, are contemplated as being within the scope of the present invention, which is limited only by the claims which follow.

What is claimed is:

1. In a filling head for transferring a sterile food product from a pipeline to a storage container, a housing having one open face adapted for flush sealing engagement with a portion of the storage container which includes a bung hole, a tubular filling nozzle having one end adapted for connection to said pipeline and extending into the interior of said housing for discharging the food product into said bung hole, and a movable wrenching device extends from the exterior to the interior of said housing for selectively withdrawing and inserting a bung in said bung hole, said housing having an inverted pot-like configuration including a generally horizontal upper wall, both the filling nozzle and the wrenching device having movable sealed mounting in the upper wall, said wrenching device including a vertical shaft which passes through the aforesaid upper wall, the lower end of said shaft being provided with means for retaining a bung in interlocked engagement, the upper end of said shaft being provided with means for selectively rotating, raising, or lowering the shaft, said tubular filling nozzle including an upper vertical portion which passes through the aforesaid upper wall and a lower portion formed to provide a lateral offset of the lowermost end of the nozzle in respect to the upper vertical portion thereof, said lateral offset being substantially equal to the lateral separation between the vertical axis of the aforesaid shaft and the vertical axis of the upper portion of the nozzle, and means connected to said upper portion of the nozzle for rotating the same so as selectively to dispose the lowermost end thereof on the extended axis of the wrenching shaft.

2. The filling head of claim 1 wherein the nozzle is vertically movable for selectively inserting its lowermost end within the bung hole of the storage container.

3. The filling head of claim 1 wherein the housing is mounted in a cradle, said cradle having means engageable with a storage container for orienting the housing in predetermined relationship to the bung in the container.

4. The filling head of claim 3 wherein the cradle is provided with an upstanding plate-like element having a guide slot formed therein, and wherein the means connected to the upper nozzle portion for rotating the same extends through said guide slot, said slot being shaped to guide the nozzle from a position wherein the lowermost end thereof is aligned with the bung hole to a position which removes the lower offset portion of the nozzle from the vicinity of the bung hole.

5. The filling head of claim 4 wherein the housing is suspended in the cradle by means of articulated linkages, yoke and lever means connected to said linkages for moving the housing relative to the cradle, and slot and pin means between the housing and cradle for restricting said movement of the housing to vertical movement.

6. In a filling head for transferring a sterile food product from a pipeline to a storage container, a housing having one open face adapted for flush sealing engagement with a portion of the storage container which includes a bung hole, a tubular filling nozzle having one end adapted for connection to said pipeline and extending into the interior of said housing for discharging the food product into said bung hole, a movable wrenching device extending from the exterior to the interior of said housing for selectively withdrawing and inserting a bung in said bung hole, and a cradle formed for releasable clamping engagement with the top of a container, said housing being mounted on said cradle for relative vertical movement.

7. In a filling head for transferring a sterile food product from a pipeline to a storage container, a housing having one open face adapted for flush sealing engagement with a portion of the storage container which includes a bung hole, a tubular filling nozzle having one end adapted for connection to said pipeline and extending into the interior of said housing for discharging the food product into said bung hole, a movable wrenching device extending from the exterior to the interior of said housing for selectively withdrawing and inserting a bung in said bung hole, and a cradle formed for releasable clamping engagement with the top of a container, and means mounting said housing on said cradle for relative movement including articulated linkages, and yoke and lever means connected to said linkages for moving said housing relative to said cradle.

8. In an apparatus for handling and processing a food product, a filling head comprising enclosure means having an opening formed for temporary sealed engagement with a storage container, conduit means extending from outside said enclosure means to the interior thereof for conducting a food product for discharge into the storage container, and mechanically operable means extending from outside said enclosure to the interior thereof for sealing the storage container subsequent to the filling thereof and prior to the removal of the enclosure means therefrom, the conduit means being movable relative to the enclosure means, both the conduit means and the mechanically operable means have movable sealed connection with the enclosure means, the enclosure means being provided with means for orienting the enclosure means on the storage means in predetermined relationship to a filling opening in the storage means, the mechanically operable means and the conduit means being mounted for constrained movement which includes alignment of at least portions of each with said filling opening, the orienting means comprising a cradle for interfitting engagement with the top of a storage container, the open face of the enclosure means being provided with a resilient gasket for flush sealing engagement with a portion of the storage container which surrounds the filling opening therein.

9. The filling head of claim 8 wherein the enclosure means is suspended by linkages from the cradle, said linkages including a lever for effecting withdrawal of the enclosure means from its sealed engagement with the storage container.

10. The filling head of claim 9 wherein the cradle has means including lever means for selectively interlocking the same with a storage container.

References Cited in the file of this patent

UNITED STATES PATENTS

| | | |
|---|---|---|
| 383,792 | Bishop | May 29, 1888 |
| 1,294,820 | Middleton | Feb. 18, 1919 |
| 1,894,403 | Konopak | Jan. 17, 1933 |
| 2,054,492 | Young | Sept. 15, 1936 |
| 2,169,241 | Hale | Aug. 15, 1939 |
| 2,341,769 | Grindrod | Feb. 15, 1944 |
| 2,406,771 | Hughes | Sept. 3, 1946 |
| 2,535,405 | Fulton | Dec. 26, 1950 |
| 2,584,584 | Hoffman et al. | Feb. 5, 1952 |
| 2,696,776 | McBean et al. | Dec. 14, 1954 |
| 2,761,603 | Fairchild | Sept. 4, 1956 |
| 2,801,087 | Hawk | July 30, 1957 |